(12) United States Patent
Foss et al.

(10) Patent No.: US 6,945,122 B2
(45) Date of Patent: Sep. 20, 2005

(54) WATER CUT METER FOR MEASUREMENT OF WATER IN CRUDE OIL-MAGNETIC

(75) Inventors: Gary C. Foss, Renton, WA (US); Matthew R. Tavares, Federal Way, WA (US); Richard R. Basham, Kent, WA (US)

(73) Assignee: The Boeing Company, Chicago, IL (US)

(*) Notice: Subject to any disclaimer, the term of this patent is extended or adjusted under 35 U.S.C. 154(b) by 77 days.

(21) Appl. No.: 10/611,369

(22) Filed: Jun. 30, 2003

(65) Prior Publication Data

US 2005/0044965 A1 Mar. 3, 2005

(51) Int. Cl.$^7$ .................................................. G01F 1/56
(52) U.S. Cl. ...................................................... 73/861.08
(58) Field of Search ........................ 73/861.04, 861.08, 73/861.11, 861.14, 152.08, 152.18; 702/45, 50

(56) References Cited

U.S. PATENT DOCUMENTS

| | | | |
|---|---|---|---|
| 5,095,758 A | 3/1992 | Cox et al. | |
| 5,127,272 A | 7/1992 | Dean et al. | |
| 5,249,455 A | 10/1993 | Cox | |
| 5,259,239 A | 11/1993 | Gaisford | |
| 5,272,444 A | 12/1993 | Cox | |
| 5,706,273 A | * 1/1998 | Guerreri | 700/283 |
| 6,076,049 A | 6/2000 | Lievois et al. | |
| 6,234,030 B1 | * 5/2001 | Butler | 73/861.04 |
| 6,292,756 B1 | 9/2001 | Lievois et al. | |
| 6,318,156 B1 | 11/2001 | Dutton et al. | |
| 6,318,172 B1 | 11/2001 | Byatt et al. | |
| 6,467,358 B1 | * 10/2002 | Nishi et al. | 73/861.04 |

\* cited by examiner

Primary Examiner—Harshad Patel
Assistant Examiner—Corey D. Mack
(74) Attorney, Agent, or Firm—Black Lowe & Graham, PLLC

(57) ABSTRACT

An apparatus, systems, and methods for measuring an amount of oil in a flow of fluid are provided. A housing defines an interior passage configured to pass a flow of fluid, and the housing has a receiving end coupled with an output of a source of the flow of fluid and an output end coupled with a fluid destination. A magnetic source is disposed inside the interior passage and the magnetic source is positioned such that a magnetic field induces an electric current in a conductive portion of the flow of fluid as the flow of fluid passes through the housing. A detector is disposed inside the interior passage between the magnetic source and the output end of the housing and the detector is configured to respond to the electric current induced and generate a signal representative of the amount of oil in the flow of fluid.

74 Claims, 4 Drawing Sheets

WATER CUT METER FOR MEASUREMENT OF WATER IN CRUDE OIL-MAGNETIC

FIELD OF THE INVENTION

This invention relates generally to oil drilling and, more specifically, to measuring an amount of oil produced by a well.

BACKGROUND OF THE INVENTION

Production of oil and related petrochemicals generally begins with drilling wells into the Earth's crust to tap underground oil reserves. Drilling oil wells represents a considerable investment because the wells often must be drilled in remote locations and/or be drilled very deeply to reach oil. Moreover, the investment is a risky proposition because the drilling may not reach oil.

Considering how expensive and risky it is to drill oil wells, maintaining the wells is an important concern. If a well stops being productive, it is desirable to shut down the well rather than wastefully invest in its continued operation. Thus, it is desirable to monitor a well's production to determine whether it continues to be a viable well. Even more importantly, it is desirable to monitor a well's production to prevent a productive well from being lost. On occasion, a well's production may decline sharply if the well should become blocked or otherwise impeded. If timely action is taken to address the impediment, the well can continue to be productive. On the other hand, without timely action, the well can be lost permanently, resulting in a waste of the investment to drill and maintain the well to that point.

Monitoring a well's production to review its viability or prevent loss of the well is not a simple proposition. The output of such wells usually includes not only oil, but, also natural gas, water, and other substances. It is not desirable to invest in continued operation of an oil well that is yielding only water. More importantly, a formerly oil-producing well beginning to increasingly yield water may indicate a serious problem. If the problem is left untreated, the well could be lost.

A flow meter alone may indicate that the well is producing when, in fact, the well is producing only water. As a result, a more precise form of monitoring is desired. Unfortunately, valuable oil can exist in many different consistencies ranging from a prototypical thick, black crude to a very thin, gasoline-like fluid. Thus, successfully augmenting the flow meter to determine production of oil is not as simple as gauging the thickness of a flow of fluid being produced. An accurate assessment of the percentage of the water contained in the flow of fluid, known as a "water cut," is desired to be able to actually assess the well's production.

To address this need, a number of different technologies have been devised to measure oil production. Unfortunately, these technologies tend to involve devices that are expensive, large, delicate, and highly sophisticated. For example, oil measuring devices using gamma rays or microwaves can monitor a flow of fluid drawn from a well and accurately gauge the amount of oil contained in that flow. Unfortunately, these devices also present a number of drawbacks, foremost of which is that these devices tend to be very expensive. As a result, it is not practical to acquire such a device for each well to continually monitor the well's production. Typically, these advices are moved around to periodically spot-check various wells. Moving these devices around in itself is a problem because the equipment is large and heavy, and must be carried by truck from site to site. Unfortunately, by the time a well is due for spot-check and the equipment is moved on-site, a permanent problem may have arisen resulting in the well already having been lost.

Current technologies also present other concerns. Devices using microwaves, to name one example, can be sensitive and require sophisticated care for routine upkeep. Moreover, microwave devices beyond a certain nominal output need to be licensed and regulated, adding to the complexity of their use. Moreover, such devices, used improperly, can present an environmental or human hazard.

To improve on these technologies, researchers have focused on ways to separate oil from foreign matter, natural gas, water, and other substances in the well. If the oil can be separated, then it can be a relatively simple matter to gauge a quantity of oil being produced. Given time, this separation is not a problem. Foreign matter can be separated from the oil by passing it through a filtering medium, comparable with the way that foreign matter is filtered from an automobile's oil supply by passing the automobile's oil through an oil filter. Separating the natural gas also is usually not difficult, because the less dense natural gas expands and rises out of the oil. In addition, given time, mixed oil and water also will separate themselves. Oil has a lesser density than water. Thus, if mixed oil and water are left in a collection tank, the oil will rise to the top and the water will sink to the bottom. The oil can then be collected by siphoning the oil off the top of the tank, or the water can be drained from the bottom of the tank, leaving only the oil in the tank. However, it may not be practical to allow enough time for mixed oil and water to separate themselves. Further, faster technologies to separate oil from other fluids and substances continue to prove to be complicated, difficult, and/or costly.

Thus, there is unmet need in the art for a better, cheaper, and safer way to measure an amount of oil contained in a flow of fluid extracted from an oil well.

SUMMARY OF THE INVENTION

The present invention provides an apparatus, system, and method for inexpensive and reliable measurement of an amount of oil within a flow of fluid extracted from a well. In general, capacitance of a fluid represents a good measure of a relative amount of oil contained in the flow of fluid when the flow of fluid contains approximately at least one-half water, although capacitance does not provide as clear a measure for fluids that are less than one-half water. On the other hand, conductance of a fluid generally represents a good measure of a relative amount of oil contained in the flow of fluid when the flow of fluid contains approximately not more than one-half water, although conductance does not provide as clear a measure for fluids that are more than one-half percent water. Thus, combining measurement of capacitance and conductance provides a good measure of the relative amount of oil and water in a flow of fluid regardless of the relative percentage of each contained in the flow of fluid.

More particularly, embodiments of the present invention provide an apparatus, systems, and methods for measuring an amount of oil in a flow of fluid. A housing defines an interior passage configured to pass a flow of fluid, and the housing has a receiving end coupled with an output of a source of the flow of fluid and an output end coupled with a fluid destination. A magnetic source is disposed inside the interior passage and the magnetic source is positioned such that a magnetic field induces an electric current in a conductive portion of the flow of fluid as the flow of fluid passes through the housing. A detector is disposed inside the interior passage between the magnetic source and the output end of the housing and the detector is configured to respond to the electric current induced and generate a current flow signal representative of the amount of oil in the flow of fluid.

In accordance with further aspects of the invention, the current flow signal can be digitized and provided to a computing module configured to calculate the proportion of oil in the flow of fluid based on the current flow signal. A flow rate sensor can be included and its output combined with the proportion of oil in the flow of fluid to arrive a total rate of flow of oil. Other sensors can be added to measure pressure, density, and temperature of the flow of fluid and the total rate of flow of oil can be adjusted to reflect these parameters. Data collected and generated can be communicated to a data collection device for monitoring.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention an apparatus, systems, and methods for measuring an amount of oil in a flow of fluid. A housing defines an interior passage configured to pass a flow of fluid, and the housing has a receiving end coupled with an output of a source of the flow of fluid and an output end coupled with a fluid destination. A magnetic source is disposed inside the interior passage and the magnetic source is positioned such that a magnetic field induces an electric current in a conductive portion of the flow of fluid as the flow of fluid passes through the housing. A detector is disposed inside the interior passage between the magnetic source and the output end of the housing and the detector is configured to respond to the electric current induced and generate a current flow signal representative of the amount of oil in the flow of fluid.

Figure 1:
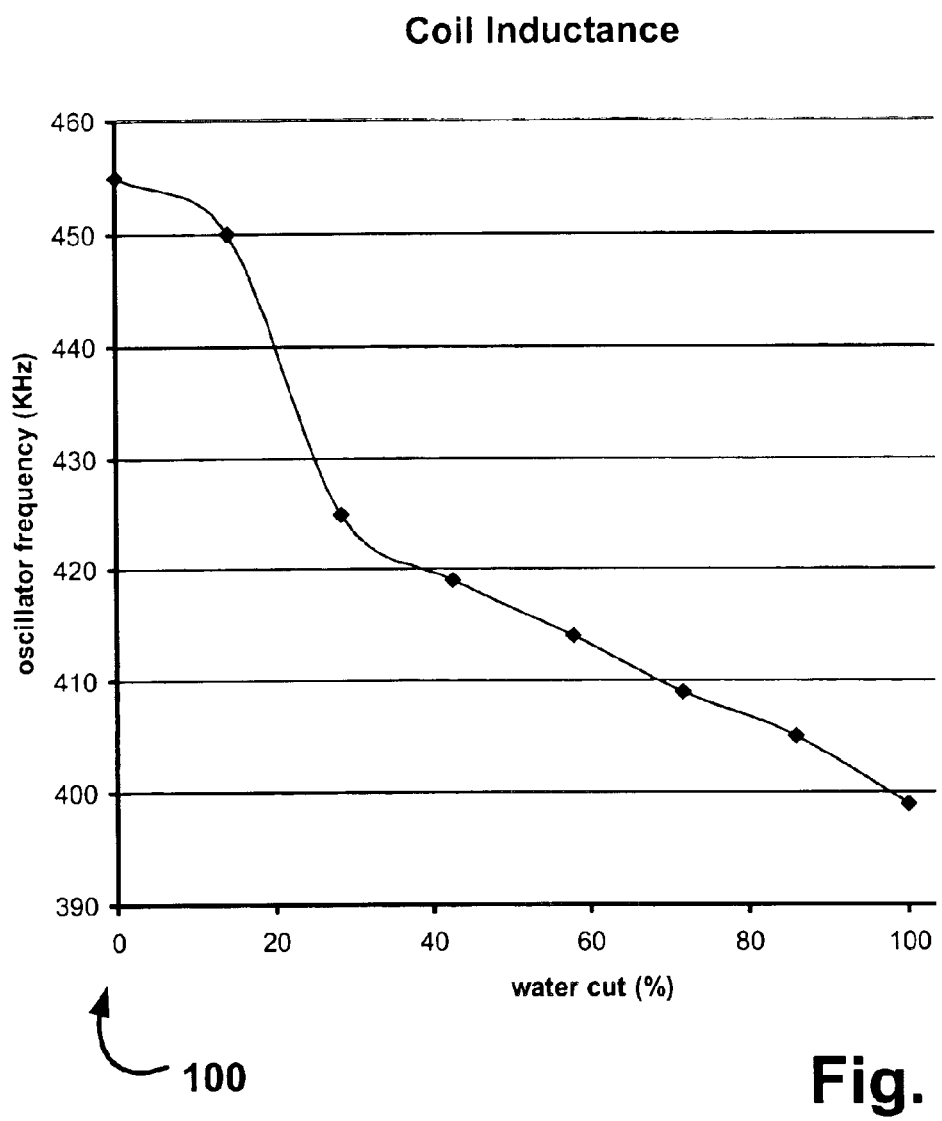
FIG. 1 is a graph of coil inductance versus a percentage of water in a flow of fluid including oil and water.

Referring to FIG. 1, a graph 100 plots coil inductance versus a fractional amount of water, or "water cut," in a flow of fluid including oil and water. More specifically, the graph 100 plots oscillator frequency responsive to an applied magnetic signal, with the responsive oscillator frequency varying as a function of the percentage of water in the flow of fluid being monitored. Applying a magnetic field to a flow of fluid induces a flow of electric current in a conductive component of the flow of water. The water component of the flow of fluid drawn from an oil well has a salinity level comparable to sea water and, thus, is conductive. By contrast, oil is not conductive. Thus, the relative proportion of oil to water in the flow of fluid can be determined by measuring a current induced in the flow of fluid by introduction of a magnetic field.

Figure 2:
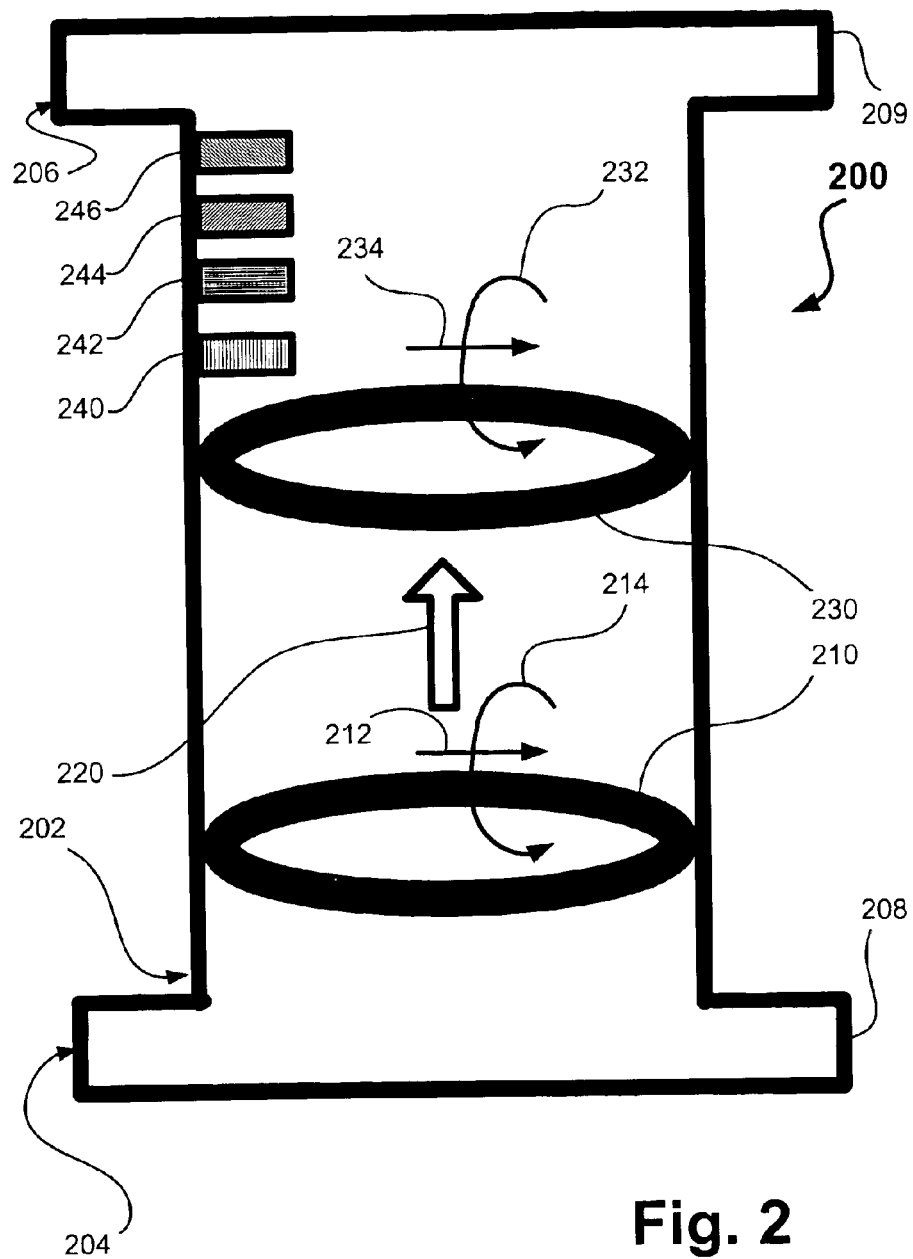
FIG. 2 is a cross-sectional view of a measuring device according to an embodiment of the present invention.

FIG. 2 is a cross-sectional diagram of a measuring device 200 according to an embodiment of the present invention. One presently preferred embodiment of the device includes a housing 202 including a section of flanged pipe. A first input end 204 is coupled with a source of a flow of fluid (not shown) and a second outlet end 206 is coupled with an outlet for the flow of fluid. Flanges 208 and 209 and the first input end 204 and the second outlet end 206, respectively, allow the housing 202 to be coupled with flanged pipes for easy installation into a typical oil pumping installation. The housing 202 can be made of steel, copper, iron, PVC (which can be opaque, translucent, or clear for viewing the flow of fluid), or another suitable material as desired for a particular application.

Positioned inside the housing 202 is a magnetic field source 210 which, in one presently preferred embodiment, is an electromagnet. The magnetic field source 210 in this embodiment is a toroidal magnet powered by an external power source (not shown) via conductors (not shown). Applying a current 214 to the magnetic field source 210 results, according to the right-hand rule, in an induced magnetic field 212 revolving counterclockwise around the direction of the current 214 from a perspective of one toward whom the current is flowing as shown in FIG. 2. The induced magnetic field 212 in turn results in an induced current 220 in a conductive portion of a flow of fluid passing through the housing. As previously described, a saline water component in the flow of fluid conducts electricity. A magnitude of the induced current 220 is a function of the controllable magnetic field 214 induced by the magnetic field source 210 and the proportion of the flow of fluid that is conductive. Knowing one of the variables affecting the induced current 220, in this case the induced magnetic field 212, the conductive proportion of the flow of fluid can thus be measured from the magnitude of the induced current 220.

To measure the magnitude of the induced current 220 in the embodiment of the device 200, an inductance coil 230 is disposed downstream in the flow of fluid from the magnetic field source 210. The induced current 220 carried by the flow conductive portion of the flow of fluid being passing through the inductance coil 230 results in a magnetic field 232 being induced in the inductance coil. The magnetic field 234, according to the right-hand rule, results in a current 232 being generated in the inductance coil 230 which can be measured via conductors (not shown) coupling the inductance coils and a suitable measuring device (not shown). Thus, monitoring the induced current 220, a proportion of water in the flow of fluid containing water and oil can be determined, thereby allowing a relative proportion of oil in the flow of fluid to be measured."

If desired in other embodiments of the present invention, additional sensors allow for measurements to be made of the total amount of fluid passing through the housing 202 and to adjust such measurements for pressure, density, temperature, or other factors. For example, a flow sensor 240 disposed within the housing 202 suitably is a calorimetric flow sensor or other, similar device operable to monitor a rate of the flow of fluid. An output (not shown) of the flow sensor 240 indicating the rate of the flow of fluid can be combined with relative proportion measurements yielded by the inductance coil 230 to determine a total flow rate of oil in the flow of fluid. In other words, the induced current 220 of the flow of fluid can determine what proportion of the flow of fluid is oil, and multiplying that proportion by the total rate of flow yields the total rate of flow of oil being drawn through the measuring device 200.

The total rate of flow of oil can be affected by pressure, density, and temperature of the flow of fluid. Accordingly, if a measurement adjusted for these variables is desired, the measuring device 200 can include sensors to measure these properties and the resulting measurement can be used to adjust the measurements previously calculated. A pressure sensor 242 can be deployed in the housing 202 to gauge the pressure of the flow. The pressure sensor 242 suitably is a piezoelectric sensor or other suitable pressure-sensing devices. A temperature sensor 244 can be disposed within the housing 202 to measure a temperature of the flow of fluid. The temperature sensor 244 suitably is a thermocouple or other similar temperature-sensing device. A density probe 246 also can be deployed within the housing 202 to measure the density of the flow of fluid. The density probe 246 may be a nuclear density probe or another suitable device. Each of these sensors is coupled with suitable signal lines that can be coupled to a computing device to collect their measurements such that they can be applied to adjust the measurements previously collected.

Figure 3:
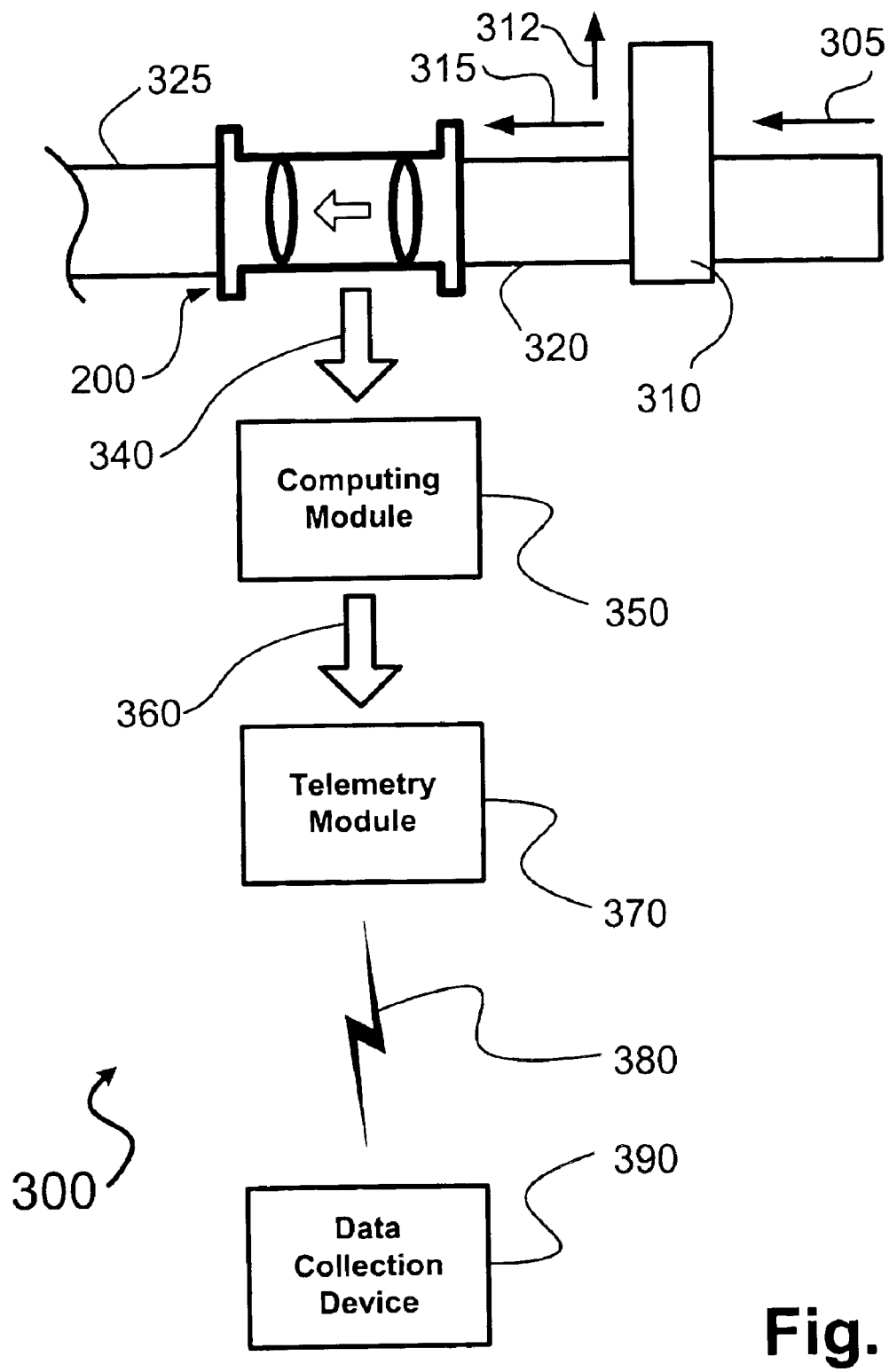
FIG. 3 is a block diagram of a system for collecting data yielded by a measuring device according to an embodiment of the present invention.

FIG. 3 is a block diagram of the measuring device 200 (FIG. 2) and a system 300 for collecting data yielded by the measuring device 200 in one presently preferred embodiment. The measuring device 200 is coupled with a source of the flow of fluid 315 via a pipeline or other vessel 320. A gas separation device 310, which suitably is a gas liquid cylindrical cyclone separator or a comparable device, separates liquid from gas. The gas separation device 310 receives a composite flow 305 containing at least one of oil, water, and gas. The gas separation device 310 separates the gas from the liquid, resulting in a separated flow of gas 312 diverted from the flow of fluid 315. The flow of fluid 315 passes through the measuring device 200 to a pipeline 325 routing the flow of fluid to a destination (not shown). Thus, when operation of the measuring device 200 is described, it will be appreciated that the measuring device 250 could be substituted in place of the measuring device 200.

The measuring device 200 is coupled via a communication device 340 to a computing module 350. The communication device 340 suitably includes a plurality of conductors directly joining the sensors directly to a computing module 350. In this exemplary embodiment, output of the sensors, including an inductance coil 230 (FIG. 2), flow rate sensor 240, or other sensors is represented by analog signals. Alternatively, an analog-to-digital converter (not shown) may be included within the measuring device 200 itself, with an output of the analog-to-digital converter being coupled to the computing module 350. The digitized output of the sensors deployed in the measuring device 200 may be coupled to an interface, such as an RS-232 interface, which is coupleable to a complementary connector on the computing module 350.

The computing module 350 digitizes and processes the analog signals or processes the digital signals from the sensors 230, 240, 242, 244, and 246 (FIG. 2) as previously described. The computing module 350 receives the induced current signal from the inductance coil 230 or other current measuring device. The computer module 350 uses the digital or digitized signals to determine the proportion of oil in the flow of fluid. The proportion of oil in the flow of fluid can be combined with output of the flow rate sensor 240 (FIG. 2) to calculate the total rate of flow of oil. The total rate of flow of oil can be adjusted for pressure, density, and temperature measurements taken of the flow of fluid as previously described."

An output of the computing module 350 is coupled through a suitable communications interface 360 to a telemetry module 370. The telemetry module 370 is used to communicate results of the measurements made by the measuring device 200 and/or calculations performed by the computing module 350 via a communications medium 380 to a data collection device 390 that advantageously can be remotely located from the flow of fluid being measured. At the data collection device 390, data can be reviewed to monitor the production or viability of the well without having to be present locally at the measuring device 200 to monitor the flow of fluid.

Many variations on the system 300 are possible. To name a few non-limiting examples, operators of the system might choose to directly monitor the current induced in the flow of fluid and have that data relayed to the data collection device 390. Sensors may be chosen that generate digital data, obviating use of the analog-to-digital converting circuit. Alternatively, the operators may wish to measure only the proportion of oil in the flow of fluid and communicate those signals from the measuring device 200 to the data collection device 390. Those measurements suitably are performed in hardware built into the measuring device 200 or within the computing module 350.

Alternatively, the operators of the system 300 may want information regarding the total rate of flow of oil with or without the capacitance, conductance, or proportion of oil in the flow of fluid data relayed to the data collection device 390. Similarly, the operators may want the total rate of flow of oil adjusted for one or more of pressure, density, and temperature, with or without the other data. Computations and adjustments suitably are made at the measuring device 200, in the computing module 350, at the data collection device 390, or at other locations as desired. Many permutations of the type of data communicated and where the data is received and/or manipulated are possible using embodiments of the present invention.

Similarly, different types of data communication systems suitably are used. The telemetry module 370 and the data communications network 380 could be a wired or wireless telemetry system configured to communicate with a remote data collection device 390. The data communications network 380 could be a telephone system, the Internet, a private Intranet, or another data network. Alternatively, the telemetry module 370 and the data communications network 380 could simply be a coupling and a cable to a nearby or on-site data collection device. The data may be communicated in real time or in batch mode. Again, many permutations are possible using embodiments of the present invention.

Figure 4:
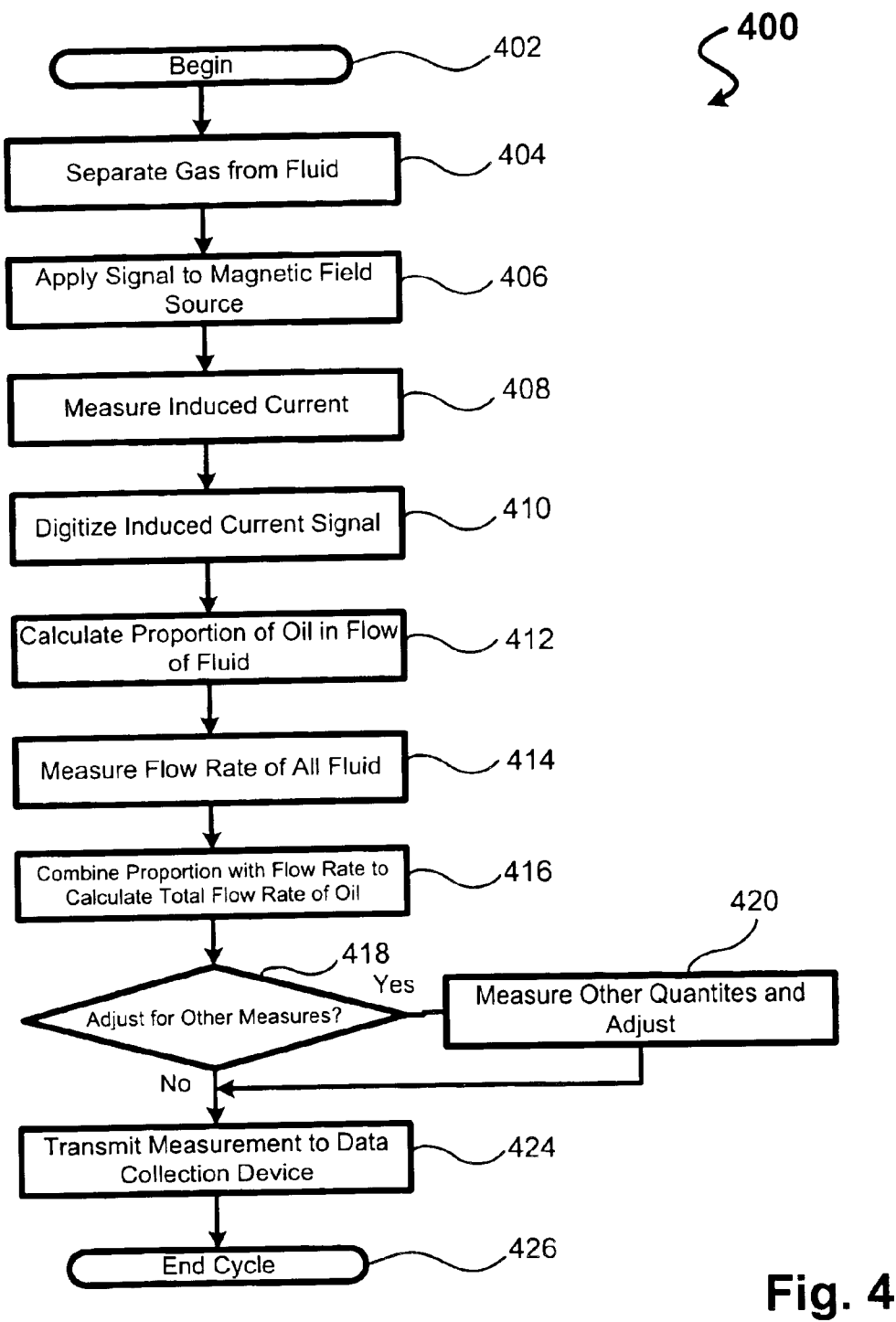
FIG. 4 is a flowchart of a routine using an embodiment of the present invention.

FIG. 4 is a flowchart of one presently preferred routine 400 using an embodiment of the present invention. The routine 400 begins at a block 402. At a block 404, gas is separated from the flow of fluid as previously described. At a block 406, using one presently preferred embodiment 200 (FIG. 2) of the present invention, a signal is applied to a magnetic field source. At a block 408, an induced current caused by the imposition of the magnetic field is measured. At a block 410, the signal representing the induced current is digitized. At a block 412, a proportion of oil in the flow of fluid is calculated from the induced current measured. Such calculation could be made using a look-up table keyed to a range of applied signals or through a similar method.

If desired, at a block 414 the flow rate of the entire flow of fluid is measured. At a block 416, the flow rate is combined with the proportion of oil in the flow of fluid to determine a total rate of oil flowing through the measuring device 200 (FIG. 2). At a decision block 418 it is determined if other measurements such as pressure, temperature, or fluid density are to be measured and applied to adjust the total rate of oil flowing in the flow of fluid. If so, at a block 420 the other quantities are measured and the total rate of oil flowing is adjusted. If no such adjustment is desired or after an adjustment is made, at a block 424 the measurements are communicated to a data collection device. The routine 400 ends at a block 426. The routine 400 could be repeated continually, at intervals, on demand, or as otherwise desired.

While the preferred embodiment of the invention has been first illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for measuring an amount of oil in a flow of fluid, the apparatus comprising:
a housing having an interior passage configured to have a flow of fluid pass therethrough, the housing having a receiving end coupled with an output of a source of the flow of fluid and an output end coupled with a fluid destination;
a magnetic source disposed inside the interior passage, the magnetic source being positioned such that a magnetic field producible by the magnetic source is configured to induce an electric current in a conductive portion of the flow of fluid as the flow of fluid passes from the receiving end of the housing to the output end of the housing; and
a detector disposed inside the interior passage between the magnetic source and the output end of the housing, the detector being configured to respond to the electric current induced in the conductive portion of the flow of fluid and generate a first signal representative of an amount of oil the flow of fluid.

2. The apparatus of claim 1, wherein the housing includes a first end coupled with an outlet of a source of the flow of fluid and a second end.

3. The apparatus of claim 2, wherein the first and second ends of the housing include flanges such that the flanges are coupleable with flanged pipe sections.

4. The apparatus of claim 2, further comprising a gas separator coupled between the first end of the housing and the source of the flow of fluid, the gas separator being configured to allow separation of gas from the flow of fluid.

5. The system of claim 4, wherein the computing module is further configured to combine the fifth signal with the fourth signal for calculating an adjusted total flow rate of oil in the flow of fluid, the computing module being further configured to generate a sixth signal representative of the adjusted total flow rate of oil.

6. The system of claim 4, wherein the at least one additional fluid property sensor includes at least one pressure sensor configured to measure a pressure of the flow of fluid passing through the interior passage of the housing.

7. The system of claim 4, wherein the at least one additional fluid property sensor includes a density sensor configured to measure a density of the flow of fluid passing through the interior passage of the housing.

8. The system of claim 7, wherein the density sensor includes a nuclear density sensor.

9. The system of claim 4, wherein the at least one additional fluid property sensor includes a temperature sensor configured to measure a temperature of the flow of fluid passing through the interior passage of the housing.

10. The apparatus of claim 1, wherein the housing includes one of a steel pipe, an iron pipe, a copper pipe, an opaque PVC pipe, a translucent PVC pipe, or a clear PVC pipe.

11. The apparatus of claim 1, further comprising an analog-to-digital converting circuit configured to convert the first signal into a first digital signal.

12. The apparatus of claim 11, further comprising an interface configured to communicate the first digital signal.

13. The apparatus of claim 12, wherein the interface includes an RS-232 interface.

14. The apparatus of claim 12, further comprising a first telemetry module configured to receive the first digital signal from the interface and to communicate the first digital signal to a data collection device.

15. The apparatus of claim 11, further comprising a computing module configured to receive the first digital signal and compute a relative amount of oil in the flow of fluid, the computing module being further configured to generate a second signal indicative of the relative amount of oil in the flow of fluid.

16. The apparatus of claim 15, further comprising at least one telemetry module configured to communicate the second signal to the data collection device.

17. The apparatus of claim 15, further comprising a flow rate sensor disposed on the interior passage of the housing, the flow rate sensor being configured to measure a total rate of the flow of fluid passing through the interior passage of the housing and to generate a third signal indicative of the total rate of flow of fluid.

18. The apparatus of claim 17, wherein the computing module is further configured to combine the second signal with the third signal for calculating a total flow rate of oil in the flow of fluid, the computing module being further configured to generate a fourth signal indicative of the total flow rate of oil.

19. The apparatus of claim 18, further comprising at least one telemetry module configured to communicate the fourth signal to the data collection device.

20. The apparatus of claim 18, further comprising at least one additional fluid property sensor disposed on the interior passage of the housing, the at least one additional fluid property sensor being configured to measure an additional fluid property of the flow of fluid passing through interior passage of the housing and generate a fifth signal.

21. The apparatus of claim 20, wherein the computing module is further configured to combine the fifth signal with the fourth signal for calculating an adjusted total flow rate of oil in the flow of fluid, the computing module being further configured to generate a sixth signal indicative of the adjusted total flow rate of oil.

22. The apparatus of claim 21, further comprising at least one telemetry module configured to communicate the adjusted amount of oil signal to the data collection device.

23. The apparatus of claim 21, wherein the at least one additional fluid property sensor includes at least one pressure sensor configured to measure a pressure of the flow of fluid passing through the interior passage of the housing.

24. The apparatus of claim 21, wherein the at least one additional fluid property sensor includes a density sensor configured to measure a density of the flow of fluid passing through the interior passage of the housing.

25. The apparatus of claim 24, wherein the density sensor includes a nuclear density sensor.

26. The apparatus of claim 21, wherein the at least one additional fluid property sensor includes a temperature sensor configured to measure a temperature of the flow of fluid passing through the interior passage of the housing.

27. A system for measuring an amount of oil in a flow of fluid, the system comprising:
a housing having an interior passage configured to have a flow of fluid pass therethrough, the housing having a receiving end coupled with an output of a source of the flow of fluid and an output end coupled with a fluid destination;

a magnetic source disposed inside the interior passage, the magnetic source being positioned such that a magnetic field producible by the magnetic source is configured to induce an electric current in a conductive portion of the flow of fluid as the flow of fluid passes from the receiving end of the housing to the output end of the housing;

a detector disposed inside the interior passage between the magnetic source and the output end of the housing, the detector being configured to respond to the electric current induced in the conductive portion of the flow of fluid and generate a first signal representative of an amount of oil the flow of fluid;

an analog-to-digital converting circuit configured to convert the first signal into a first digital signal;

a computing module configured to receive the first digital signal and compute a relative amount of oil in the flow of fluid, the computing module being further configured to generate a second signal representative of the relative amount of oil; and an interface configured to communicate the second signal.

28. The system of claim 27, wherein the housing includes a first end coupled with an outlet of a source of the flow of fluid and a second end.

29. The system of claim 28, wherein the first and second ends of the housing include flanges such that the flanges are coupleable with flanged pipe sections.

30. The system of claim 28, further comprising a gas separator coupled between the first end of the housing and the source of the flow of fluid, the gas separator being configured to allow separation of gas from the flow of fluid.

31. The system of claim 27, wherein the housing includes one of a steel pipe, an iron pipe, a copper pipe, an opaque PVC pipe, a translucent PVC pipe, or a clear PVC pipe.

32. The system of claim 27, wherein the interface includes an RS-232 interface.

33. The system of claim 27, further comprising a first telemetry module configured to receive the first digital signal from the interface and to communicate the second signal to a data collection device.

34. The system of claim 27, further comprising a flow rate sensor disposed on the interior passage of the housing, the flow rate sensor being configured to measure a total rate of the flow of fluid passing through the interior passage of the housing and to generate third signal indicative of the total rate of the flow of fluid.

35. The system of claim 34, wherein the computing module is further configured to combine the second signal with the third signal for calculating a total flow rate of oil in the flow of fluid, the computing module being further configured to generate a fourth signal indicative of the total flow rate of oil.

36. The system of claim 35, further comprising at least one telemetry module configured to communicate the fourth signal to the data collection device.

37. The system of claim 35, further comprising at least one additional fluid property sensor disposed on the interior passage of the housing, the at least one additional fluid property sensor being configured to measure an additional fluid property of the flow of fluid passing through interior passage of the housing and generate a fifth signal representative of the additional fluid property.

38. The system of claim 27, further comprising at least one telemetry module configured to communicate the sixth signal to the data collection device.

39. A system for measuring an amount of oil in a flow of fluid, the system comprising:

a housing having an interior passage configured to have a flow of fluid pass therethrough, the housing having a receiving end coupled with an output of a source of the flow of fluid and an output end coupled with a fluid destination;

a magnetic source disposed inside the interior passage, the magnetic source being positioned such that a magnetic field producible by the magnetic source is configured to induce an electric current in a conductive portion of the flow of fluid as the flow of fluid passes from the receiving end of the housing to the output end of the housing;

a detector disposed inside the interior passage between the magnetic source and the output end of the housing, the detector being configured to respond to the electric current induced in the conductive portion of the flow of fluid and generate a first signal representative of an amount of oil the flow of fluid;

a flow rate sensor disposed on the interior passage of the housing, the flow rate sensor being configured to measure a total rate of the flow of fluid passing through the interior passage of the housing and to generate a second signal representative of the total rate of the flow of fluid;

an analog-to-digital converting circuit configured to convert the first signal into a first digital signal;

a computing module configured to receive the first digital signal and compute a relative amount of oil in the flow of fluid, the computing module being further configured to generate a third signal representative of the relative amount of oil, the computing module being further configured to combine the second signal and the third signal for calculating a total flow rate of oil in the flow of fluid, the computing module being further configured to generate a fourth signal representative of the total flow rate of oil; and an interface configured to communicate the fourth digital signal.

40. The system of claim 39, wherein the housing includes a first end coupled with an outlet of a source of the flow of fluid and a second end.

41. The system of claim 40, wherein the first and second ends of the housing include flanges such that the flanges are coupleable with flanged pipe sections.

42. The system of claim 39, wherein the housing includes one of a steel pipe, an iron pipe, a copper pipe, an opaque PVC pipe, a translucent PVC pipe, or a clear PVC pipe.

43. The system of claim 39, wherein the interface includes an RS-232 interface.

44. The system of claim 39, further comprising a first telemetry module configured to communicate the fourth signal to a data collection device.

45. The system of claim 39, further comprising at least one additional fluid property sensor disposed on the interior passage of the housing, the at least one additional fluid property sensor being configured to measure an additional fluid property of the flow of fluid passing through interior passage of the housing and generate a fifth signal representative of the fluid property.

46. The system of claim 45, wherein the computing module is further configured to combine the fifth signal with the fourth signal for calculating an adjusted total flow rate of oil in the flow of fluid, the computing module being further configured to generate a sixth signal representative of the adjusted total flow rate of oil.

47. The system of claim 46, further comprising at least one telemetry module configured to communicate the sixth signal to the data collection device.

48. The system of claim 45, wherein the at least one additional fluid property sensor includes at least one pressure sensor configured to measure a pressure of the flow of fluid passing through the interior passage of the housing.

49. The system of claim 45, wherein the at least one additional fluid property sensor includes a density sensor configured to measure a density of the flow of fluid passing through the interior passage of the housing.

50. The system of claim 49, wherein the density sensor includes a nuclear density sensor.

51. The system of claim 45, wherein the at least one additional fluid property sensor includes a temperature sensor configured to measure a temperature of the flow of fluid passing through the interior passage of the housing.

52. The system of claim 39, further comprising a gas separator coupled between the first end of the housing and the source of the flow of fluid, the gas separator being configured to allow separation of gas from the flow of fluid.

53. A method for measuring an amount of oil in a flow of fluid, the apparatus comprising:
    passing a flow of fluid from a source of fluid through a housing;
    generating a magnetic field in the flow of fluid passing through the housing to induce an electric current in a conductive portion of the flow of fluid;
    measuring the current induced in the conductive portion of the flow of fluid;
    calculating a relative amount of oil in the flow of fluid based on the current induced in the conductive portion of the flow of fluid; and
    generating a first signal representative of a relative amount of oil in the flow of fluid.

54. The method of claim 53, further comprising communicating the first signal to a data collection device.

55. The method of claim 53, further comprising measuring a rate of flow of fluid through the housing.

56. The method of claim 55, further comprising calculating a total flow rate of oil in the flow of fluid by combining the rate of flow of fluid with the relative amount of oil in the flow of fluid and generating a second signal representative of the total flow rate of oil.

57. The method of claim 56, further comprising communicating the second signal to the data collection device.

58. The method of claim 56, further comprising measuring at least one additional fluid property of the flow of fluid passing through the housing.

59. The method of claim 58, further comprising calculating an adjusted total flow rate of oil in the flow of fluid by combining the total flow rate of oil in the flow of fluid with the additional property of the flow of fluid and generating a third signal.

60. The method of claim 59, further comprising communicating the third signal to the data collection device.

61. The method of claim 58, wherein the at least one additional fluid property includes fluid pressure.

62. The method of claim 58, wherein the at least one additional fluid property includes fluid density.

63. The method of claim 58, wherein the at least one additional fluid property includes fluid temperature.

64. The method of claim 53, further comprising separating gas from the flow of fluid before directing the flow of fluid from the source of fluid through the housing.

65. A method for measuring an amount of oil in a flow of fluid, the apparatus comprising:
    passing a flow of fluid from a source of fluid through a housing;
    generating a magnetic field in the flow of fluid passing through the housing to induce an electric current in a conductive portion of the flow of fluid;
    measuring the current induced in the conductive portion of the flow of fluid;
    measuring a rate of flow of fluid through the housing;
    calculating a relative amount of oil in the flow of fluid based on the current induced in the conductive portion of the flow of fluid;
    calculating a total flow rate of oil in the flow of fluid by combining the rate of flow of fluid with the relative amount of oil in the flow of fluid; and
    generating a first signal representative of the total flow rate of oil.

66. The method of claim 65, further comprising communicating the first signal to a data collection device.

67. The method of claim 65, further comprising measuring at least one additional fluid property of the flow of fluid passing through the housing.

68. The method of claim 67, further comprising calculating an adjusted total flow rate of oil in the flow of fluid by combining the total flow rate of oil in the flow of fluid with the additional property of the flow of fluid and generating a second signal.

69. The method of claim 68, further comprising communicating the second signal to the data collection device.

70. The method of claim 67, wherein the at least one additional fluid property includes fluid pressure.

71. The method of claim 67, wherein the at least one additional fluid property includes fluid density.

72. The method of claim 67, wherein the at least one additional fluid property includes fluid temperature.

73. The method of claim 67, further comprising communicating the adjusted total flow rate of oil in the flow of fluid to the data collection device.

74. The method of claim 65, further comprising separating gas from the flow of fluid before directing the flow of fluid from the source of fluid through the housing.

* * * * *